(12) United States Patent
Huang

(10) Patent No.: US 6,561,257 B2
(45) Date of Patent: *May 13, 2003

(54) COLLAPSIBLE AUTO SHADE

(76) Inventor: Sunny En Liung Huang, 786 Via Monte Video St., Claremont, CA (US) 91711

( * ) Notice: Subject to any disclaimer, the term of this patent is extended or adjusted under 35 U.S.C. 154(b) by 0 days.

This patent is subject to a terminal disclaimer.

(21) Appl. No.: 09/766,557

(22) Filed: Jan. 19, 2001

(65) Prior Publication Data

US 2001/0009179 A1 Jul. 26, 2001

Related U.S. Application Data

(63) Continuation of application No. 09/417,277, filed on Oct. 13, 1999, now Pat. No. 6,192,967.
(60) Provisional application No. 60/104,703, filed on Oct. 19, 1998.

(51) Int. Cl.[7] .................................................. B60J 1/20
(52) U.S. Cl. ............................ 160/370.23; 160/84.07; 160/134; 296/97.8
(58) Field of Search ...................... 160/370.21, 370.22, 160/370.23, 84.01, 84.04, 84.07, 134, 368.1, DIG. 2, DIG. 3; 296/97.1, 97.7, 97.8

(56) References Cited

U.S. PATENT DOCUMENTS

| 4,227,542 A | * | 10/1980 | Bonfilio | 135/4 R |
|---|---|---|---|---|
| 4,440,187 A | * | 4/1984 | Fiddler | 135/117 |
| 5,598,883 A | * | 2/1997 | Platsis | 160/370.23 |
| 5,765,619 A | * | 6/1998 | Arnold | 160/84.07 |
| 5,967,161 A | * | 10/1999 | Neal | 135/19.5 |
| 6,089,245 A | * | 7/2000 | Tseytlin et al. | 135/88.01 |
| 6,095,230 A | * | 8/2000 | Mitchell et al. | 160/370.21 |
| 6,135,191 A | * | 10/2000 | Mitchell et al. | 160/370.21 |
| 6,192,967 B1 | * | 2/2001 | Huang | 160/370.23 |
| 6,202,732 B1 | * | 3/2001 | Chen | 160/370.23 |

FOREIGN PATENT DOCUMENTS

| IT | 998689 | * | 4/1965 | 160/370.21 |
|---|---|---|---|---|

* cited by examiner

Primary Examiner—Bruce A. Lev
(74) Attorney, Agent, or Firm—Paul M. Denk

(57) ABSTRACT

A collapsible automobile shade formed of fabric that pivots about a pivot point, or a pair of pivot points, and which are expandable into a shaped configuration for adherence to the interior of an automobile windshield, when installed, to prevent the entrance of sunlight and sun rays. The shade may be disassembled, collapsed about its pivotal ribs, into a closed configuration. An alternative embodiment to the shade of this invention includes its fabrication from a flexible material, that has inherent memory, containing a series of aligned flutes, which can be expanded to form a shade of multiple shaped configurations, but due to the inherent memory of the fluted material, can be contracted by alignment of its adjacent flutes, into a compact position.

10 Claims, 9 Drawing Sheets

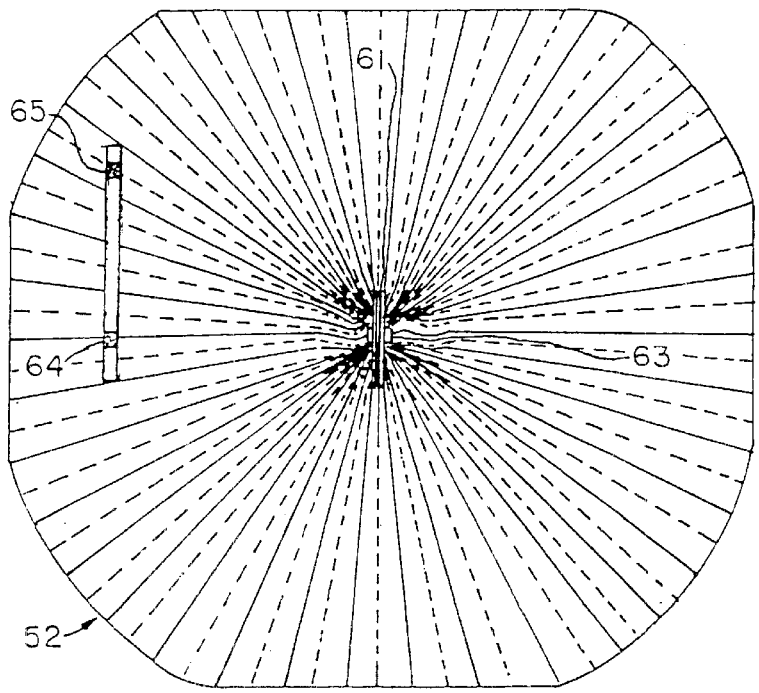
FIG.14
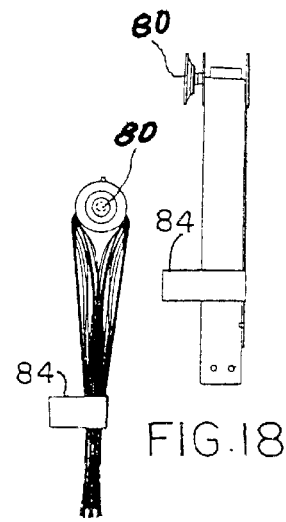
FIG.17
FIG.18
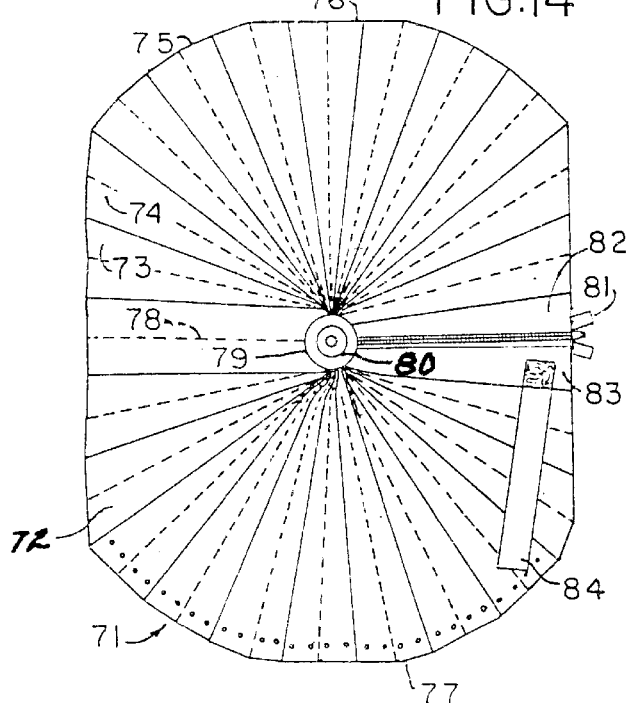
FIG.15
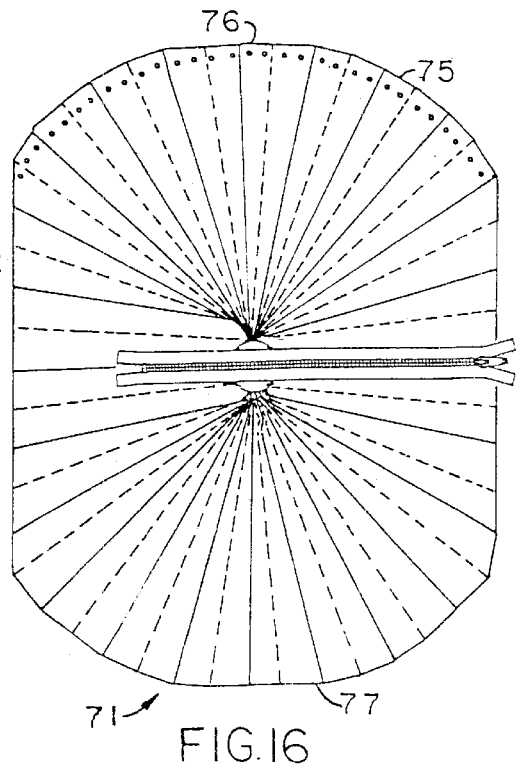
FIG.16

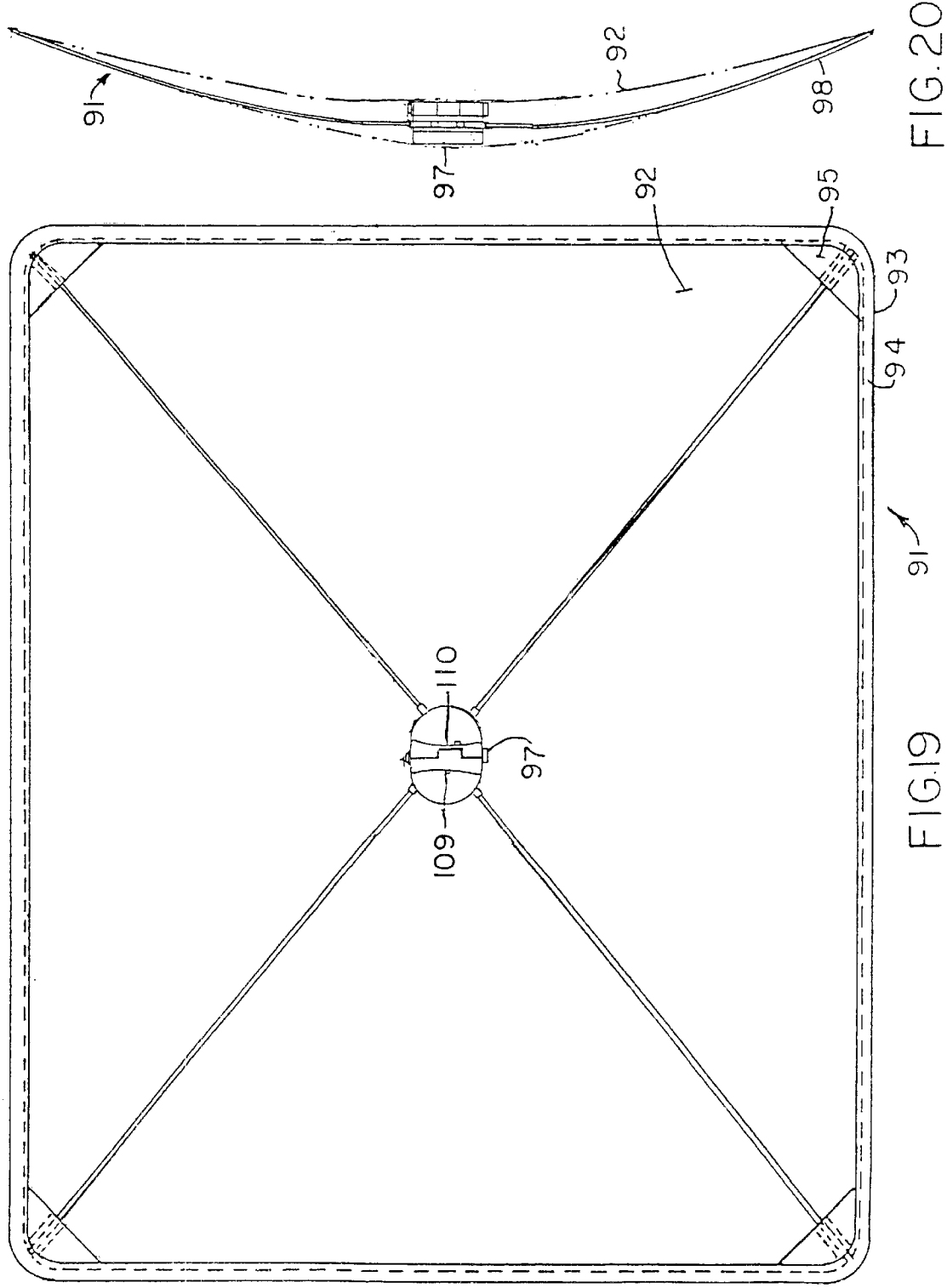

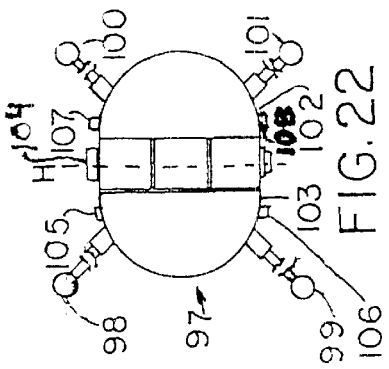
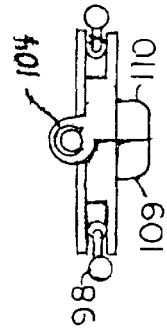
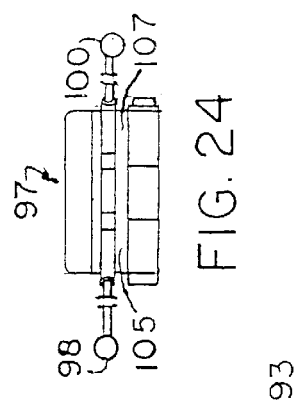
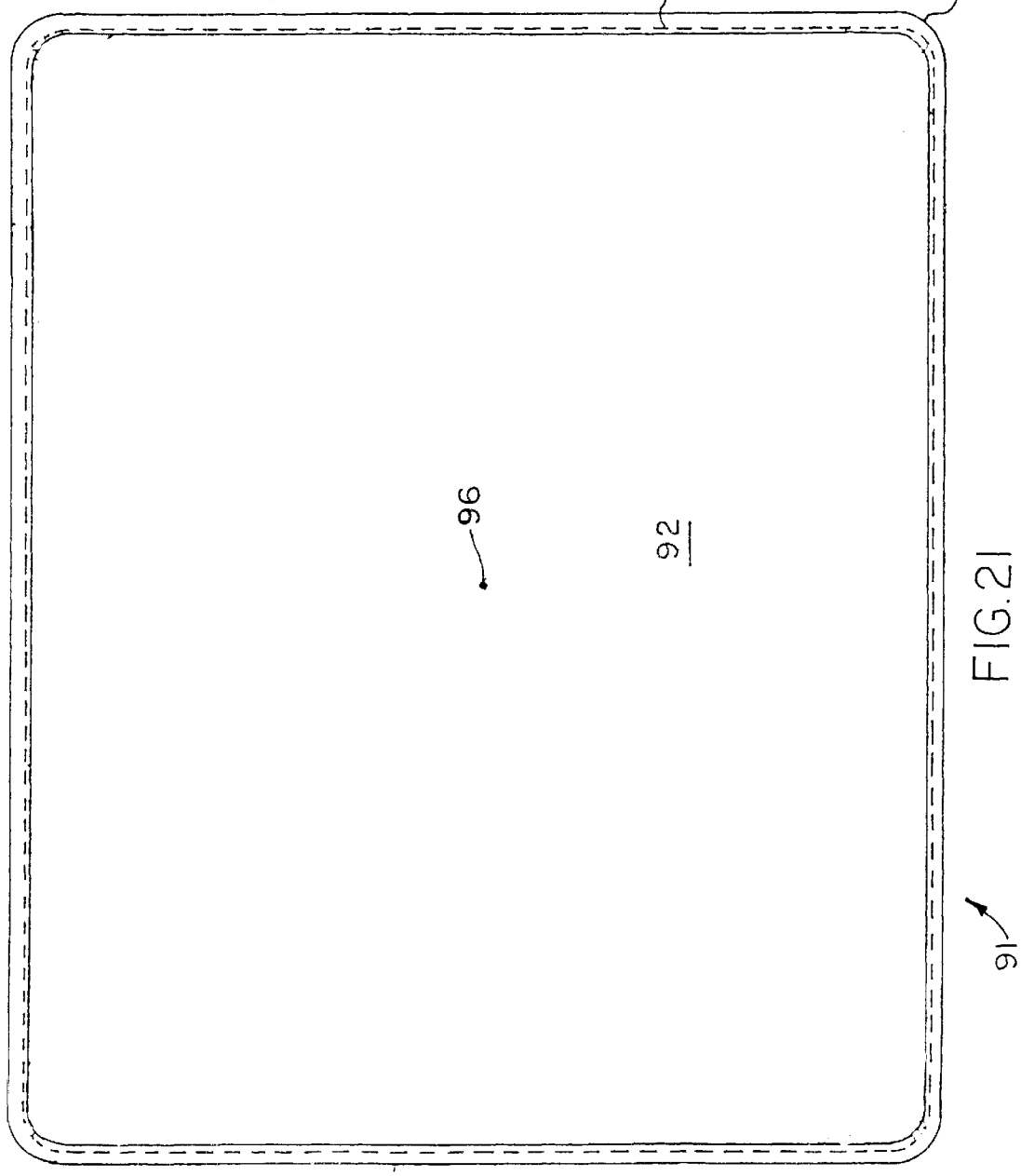

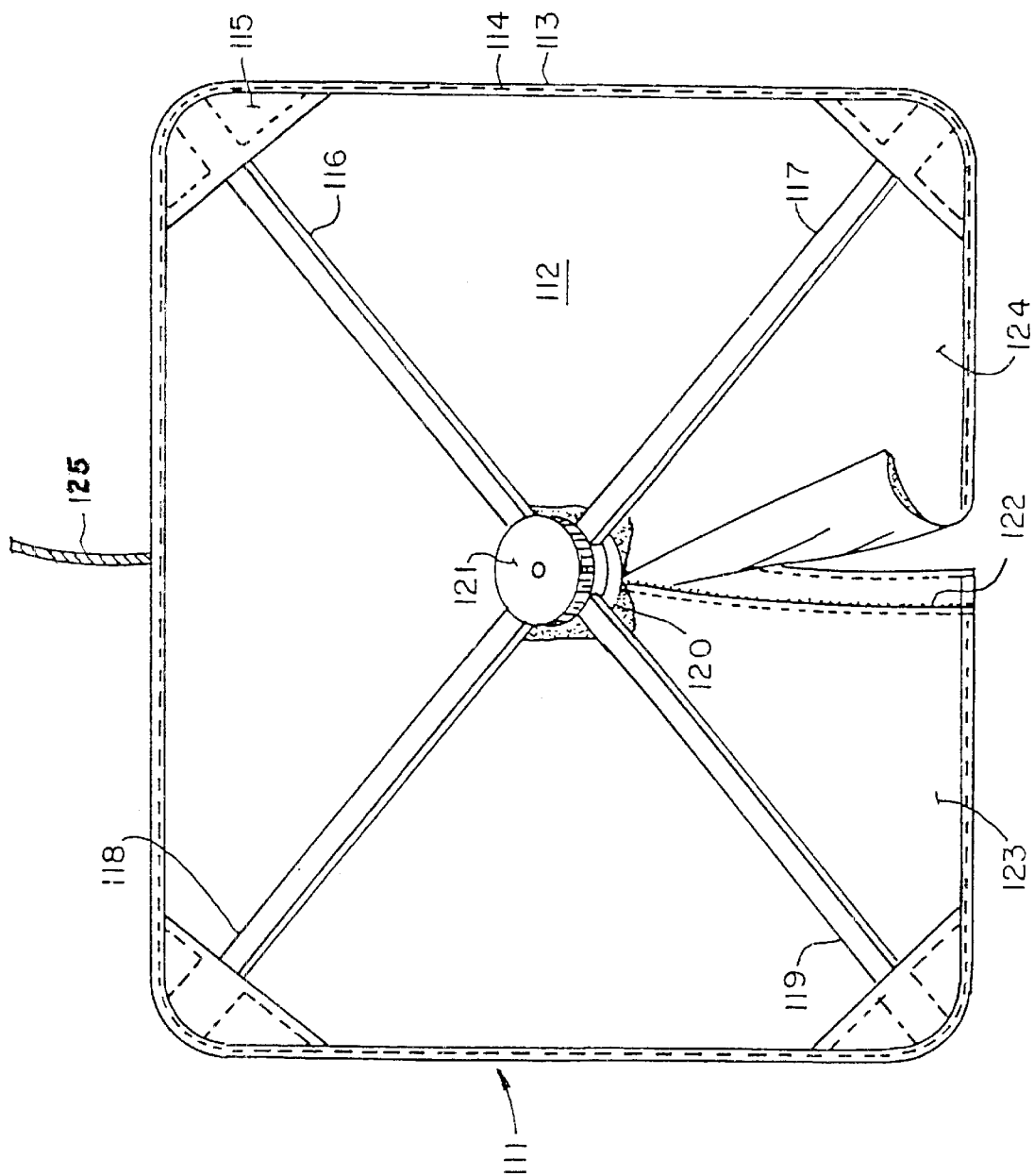

COLLAPSIBLE AUTO SHADE

CROSS REFERENCE TO RELATED APPLICATIONS

This application is a continuation of application Ser. No. 09/417,277, filed Oct. 13, 1999, now U.S. Pat. No. 6,192,967, which, in turn, claims benefit to U.S. Provisional Application No. 60/104,703, filed Oct. 19, 1998.

STATEMENT REGARDING FEDERALLY SPONSORED RESEARCH OR DEVELOPMENT

Not Applicable

BACKGROUND OF THE INVENTION

This invention relates to means for protecting the interior of an automobile, through the application of a shade generally to the interior of an automobile window, for the purpose of preventing the entrance of damaging sun rays and the generation of damaging heat. In addition, it is possible that the auto shade of this invention may likewise be used upon the exterior of any automobile window, and thereat defend against the build up of any ice, snow, or the like.

Numerous styles of various types of auto screens have long been available in the art. For example, my prior U.S. Pat. No. 5,035,460, upon an automobile window protector, shows the fabrication of such a sheet, made of flexible material, and which could be applied to both the interior and exterior of the window of an automobile. In addition, my prior U.S. Pat. No. 5,024,262, and which issued as Re-examination certificate No. B1 5,024,262, shows a compactly foldable automobile sunshade, and which provided for inherent resiliency, at least around its perimeter loop, to hold the shade in its opened configuration, and to provide protection at the vicinity of the automobile window, but which could likewise be reduced in its size through folding of its frame into a more compact arrangement for storage.

The patent to Soukup, U.S. Pat. No. 1,927,137, shows an adjustable glare shield, for use within a motor vehicle. The patent to Lessard, U.S. Pat. No. 3,373,792, discloses an automobile rain visor. The patent to Surtin, U.S. Pat. No. 4,332,414, shows an automobile window shade device, comprising a pair of duplicate fan-shaped protectors for mounting to an automobile window. The patent to Maguire, U.S. Pat. No. 4,606,572, shows a similar type of dual fan arrangement for providing a sunshade for an automobile. The patent to Tung-Chow, U.S. Pat. No. 4,681,149, discloses window blinds for a vehicle, incorporating suction cups for adherence to a supporting surface adjacent the automobile window. The patent to Gavrieli, U.S. Pat. No. 4,861,090, discloses a fan-type automobile window shade. The patent to Chen, U.S. Pat. No. 5,694,998, discloses an automobile sunshade, being adjustable, and which can be extended longitudinally to cover different sized automobile windows, during application. The patent to Platsis, U.S. Pat. No. 5,598,883, shows another vehicular sun shield, formed as a collapsible fan like member. This device also discloses the use of a plurality of pleats, formed into the configuration of the fan, for screening purposes, once extended. The patent Ruan, U.S. Pat. No. 5,660,220, discloses a pleated fan type sunshade for motor vehicles. The U.S. design Pat. No. Des. 301,449, to Silva, shows another type of automobile sunscreen formed of a pleated like member.

The United States patent to Cheny, U.S. Pat. No. 3,046,048, discloses what is a magnetically secured windshield cover, which overlies and remains contiguous with the exterior of the automobile windshield. The prior patent to Shelton, U.S. Pat. No. 2,843,421, shows an automobile windshield awning, for locating and extending forwardly of the automobile windshield, and to protect it against the elements.

The patent Ealey, et al, U.S. Pat. No. 3,184,264, shows a related type of windshield protector. The patent to Shafia, U.S. Pat. No. 4,863,943, discloses an adjustable vehicle sunshade, for fitting externally over the windshield and driver and passenger side windows. The patent to Sing, U.S. Pat. No. 4,784,215, discloses a thermal insulating shade for application over a vehicle window or windshield.

The patent to Eubanks, U.S. Pat. No. 4,736,980, discloses another form of more permanent type of windshield shade. The patent to Sarver, U.S. Pat. No. 4,560,245, discloses a vehicular windshield curtain for inhibiting heating transfer. The patent to Marchman, U.S. Pat. No. 3,336,969, shows a vehicle windshield and rear window cover. The patent to Gump, U.S. Pat. No. 1,808,652, shows a safety device for the side window of an early vehicle. The patent to Tubman, U.S. Pat. No. 1,790,333 shows a rear glare guard for an early vehicle. The patent to Crane, U.S. Pat. No. 1,732,447, discloses a sun shield, formed as a curtain, for application to the interior of an automobile window. The patent to Mahoney, U.S. Pat. No. 4,818,007, discloses a vehicle screen/shade. The patent to Miller, U.S. Pat. No. 4,790,591, shows a removable protective vehicle windshield screen. The patent to Cline, U.S. Pat. No. 4,671,558, discloses a rollable sunshield for vehicles. The patent to Richards, U.S. Pat. No. 4,652,039, shows another form of windshield shade, this one apparently made out of some type of paperboard, and which is collapsible for folding into a smaller configuration. The patent to Bruhl, U.S. Pat. No. 2,596,836, shows a glare shield for use interiorly of an automobile window. The patent to Drozt, U.S. Pat. No. 2,598,770, shows a flexible window screen. The patent to Kocinski, U.S. Pat. No. 2,489,901, shows an ice shield for application to the exterior of an automobile windshield. The patent to Osborn, U.S. Pat. No. 2,599,066, shows a multi-panel device for application over the windshield, to provide it with coverage particularly against inclement weather. The patent to Pinkerton, U.S. Pat. No. 2,751,977, shows a one-man automobile cover, for covering the entire vehicle. The patent to Moszelt, U.S. Pat. No. 2,614,630, shows a windshield cover for application over the windshield, as noted. The patent to Ketchum, U.S. Pat. No. 2,979,129, shows a similar type of windshield cover. The patent to Naterman, U.S. Pat. No. 1,475,647, discloses an adjustable visor for vehicle windshields. The patent to Omerly, Jr., U.S. Pat. No. 2,065,242, shows another form of exterior windshield protector. Finally, the patent to Gregg, U.S. Pat. No. 4,763,947, shows a sunscreen for motor vehicle, and which is apparently made of some form of paperboard, and is foldable into a more compact structure for storage.

SUMMARY OF THE INVENTION

This invention relates to a collapsible auto shade, and which may be fabricated to various configurations, generally for application interiorly of the transparent, externally facing portions of a vehicle, such as the windshield, or the rear window and side window, and to provide for shielding against the admission of sun rays, to prevent damage to the proximate interior components for the vehicle, and likewise, prevent the entrance of heat and glaring light. In certain instances, the shade may be formed of the type of material that may be reflective, such as MYLAR, or other polymer, or comprised of paper, or even a fabric, that may or may not be coated with a reflective surface, in order to reflect away the rays of sunlight, but in addition, particularly in the case where a polymer is used, may have inherent memory in its foldable or condensed position, to provide for ease of storage, but likewise, can easily be expanded into a usable configuration, approximating the size of the interior of the window against the shade as applied. The thickness of such material may be in the range of about 0.20 inch. Preferably, MYLAR polyester film has a gauge thickness of approximately 0.00048 inch through 0.014 inch in thickness.

For example, various types of shapes may be used for the shade of this invention, such as rectangular, square, round, oval, truncated, or the like, in order to provide for convenient application proximate a correspondingly shaped windshield, when applied. In addition, the shade, while being fabricated of the foregoing types of materials, can be tinted, to prevent the entrance of sun rays, or may even be formed in a mesh configuration, for visibility in side window applications, to reduce costs, weight, and materials, but yet provide convenient reflecting of the sun rays, away from the vehicle, when the shade is applied during application.

In addition, the sun shade of this invention may include means for facilitating the application and hold of the shade against the windshield, when applied, such as through the use of suction cups, that may be arranged at the corners, as at the upper and lower corners of the formed screen, or if the shade is of the bellows type, that may be folded into a fan shape configuration, about a pivot point, and that pivot point while being fabricated of means to furnish a pivoting of the various bellows forming the shade, may likewise incorporate a suction cup, thereat, to provide for its application for retention against the interior of the automobile windshield, when applied.

In one embodiment for the sun shade of this invention, it is formed more as a fan shaped device, having a series of pivotally mounted ribs, which extend from a pivot point, and have a layer of one-piece or otherwise fabric that is applied thereto, and which can be unfolded similar to an expanding fan, into one of the shapes as previously described, and located interiorly of the windshield, by one of the application methods earlier described. The bottom of the fabric may include means for holding the same together, at their seams, such as through the use of a zipper, VELCRO, or the like. Furthermore, the pivot means that holds the ribs at their point of pivot, may provide for its tightening, as by a threaded fastener, in order to secure the shade in its expanded and usable position, or when the shade is collapsed, as when not in use, in preparation for storage, and the locking means may be disengaged, to allow for the ribs to be folded into close proximity, and gathering the held fabric together, for ease of storage of the collapsible auto sun shade of this invention.

In the further embodiment of the invention, the material forming the screen may be formed of a polymer, or other fabric, or even may of a MYLAR, and which will be formed into a corrugated or bellows configuration, wherein the screen can be expanded, into its usable shape, to one of the shapes as previously analyzed, or the shade due to the inherent memory of the MYLAR, and to its fluted formation, may be collapsed, and inherently folded into a compacted position, and then folded over into closure, to provide a very condensed shade that can easily be stored, as for example, in the glove compartment, or the like.

These are examples of the style of sun shade fabricated in accordance with the teachings of this invention, and which can be utilized for furnishing internally of the automobile shading against the transmission of sun internally of the vehicle, during usage.

BRIEF DESCRIPTION OF THE DRAWINGS

In referring to the drawings,

FIG. 14 shows a bottom plan view of the embodiment of FIG. 10 in the open state of the shade;

FIG. 15 shows a top plan view of a sixth embodiment of the present invention in its open state;

FIG. 16 shows a bottom plan view of the embodiment of FIG. 15 in its open state;

FIG. 17 shows a side elevational view of the embodiment of FIG. 15 in its closed state;

FIG. 18 shows a front view of the embodiment of FIG. 15 in its closed state;

FIG. 19 shows a bottom plan view of a seventh embodiment of the present invention in its open state;

FIG. 20 shows a side elevational view of the embodiment of FIG. 19 in its open state;

FIG. 21 shows a top plan view of the embodiment of FIG. 19 in its open state;

FIG. 22 shows a bottom plan view of a hub of the embodiment of FIG. 19;

FIG. 23 shows a side elevational view of a hub of the embodiment of FIG. 19;

FIG. 24 shows a front view of a hub of the embodiment of FIG. 19; and

FIG. 25 shows a top plan view of an eighth embodiment of the present invention in its open state.

Corresponding reference characters indicate corresponding parts throughout the several views of the drawings.

DESCRIPTION OF THE PREFERRED EMBODIMENT

Figure 1:
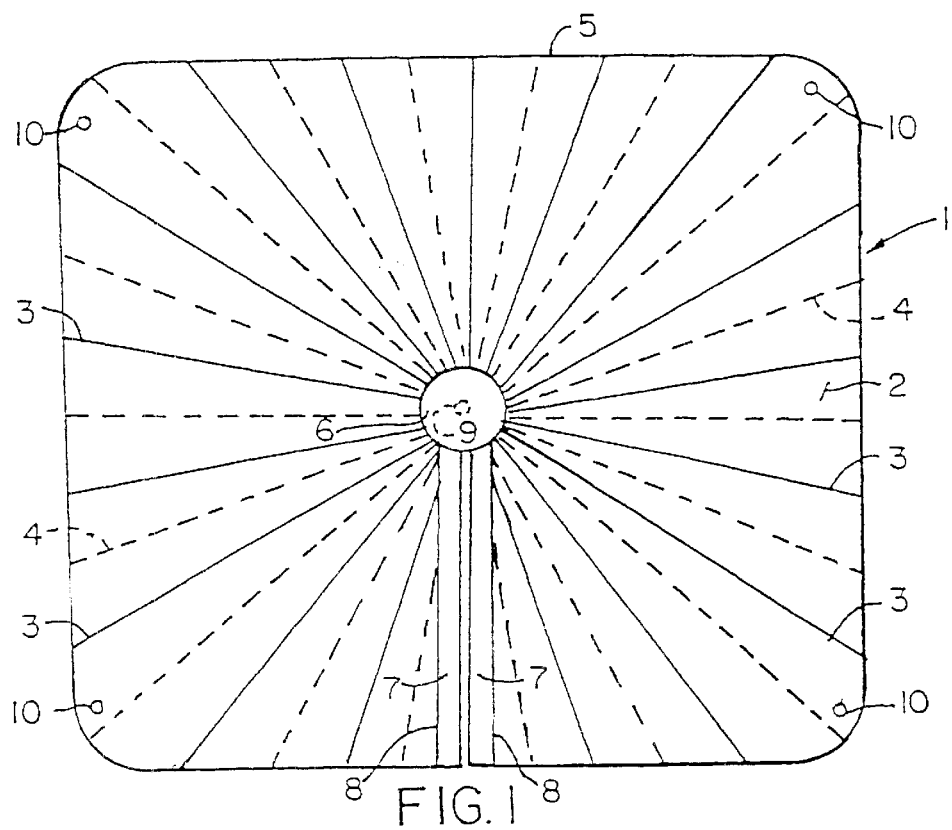
FIG. 1 provides a front view of one embodiment for the collapsible auto shade of this invention, which is of the pivotal type that can be expanded into a shaped configuration, corresponding to the interior of an automobile windshield, or pivoted into a condensed position compactly into closure, as during storage.

In referring to the drawings, and in particular FIG. 1, one embodiment of the collapsible automobile shade 1 of this invention is disclosed. It includes a fabric-like material 2 which is formed of a fluted or accordion shape, as can be noted, having a series of pleats as at 3 formed along one surface, while the opposite surface includes a series of reverse pleats 4, as can be understood. The fabric may be a cloth, polymer, or even a MYLAR. Thus, when the shade of this invention is expanded, as shown in FIG. 1, it forms a shaped screen, in this particular instance being square of design, and which can be used as a sun shade, internally of the vehicle windshield, once applied. The outer edge 5 defines the outer boundary of the shade 1. As previously explained, it is just as likely that the disclosed shape for the shade may undertake various configurations, depending upon the contour of the outer edge 5 of the shade, as it is cut into a designed configuration, and such shapes may include either the square form, as shown, rectangular of design, oval, circular, or truncated, as can be understood. It all depends upon the cut provided for the outer perimeter of the fabric material, that is used to form the shade of this invention. In the preferred embodiment, the fabric may include either a cloth fabric, and be held into position by means of a series of ribs, that may pivot about the pivot point 6, or the fabric may include its construction from a polymer, such as MYLAR, and which can be formed to the fluted design as shown, so have internal memory to allow for collapsing of the shade, once it is released, and pivoted into closure. The pivot point 6 has a series of ribs 7 extending therefrom, and which connect with the leading edges 8 of the fabric form of the screen, so that when the ribs 7 are pivoted about their pivot point 6, and drawn into proximity, as shown in FIG. 1, the screen is fully expanded and erected for usage. In the alternative, when the ribs 7 are pivoted into closure, such as by pivoting them upwardly providing for a collapse of the bellows-like material 2, the shade is then pivoted into a compact position for storage. The pivot point 6 may include a fastening means, that may threadedly connect about the pin 9, formed of the pivot point 6, so that when the shade is expanded, into the position as shown in FIG. 1, the fastener may be tightened upon its threaded engagement and lock the fan into its expanded and usable position, or the fastening means can be rotated into a loosened position, and thereby allow the fan to collapse, through a pivot into closure of its ribs 7, in the manner as previously explained.

The pivot point 6 is shown, in FIG. 1 to be generally at the vertical and horizontal midpoint of the shade when opened. However, depending on the configuration of the shade after it is cut or trimmed to a desired configuration, the pivot point may be located generally at the horizontal or vertical center of the shade, when opened. That is, the pivot point might be offset from the center of the shade, when opened, either vertically or horizontally.

Furthermore, the screen of this position may be fixed into position through the usage of, for example, a suction cup, that may be applied to the opposite face of the pivot member 6, and which can be directly adhered to the interior of the automobile windshield, for application and fastening of the screen in proximity with the window during usage. Or, the screen may include a series of fastening means 10, proximate their corners, and which may cooperate with fastening means, such as double faced adhesive tape, ties, or the like, for securing the shade into position internally of the automobile windshield, during usage.

Figure 2:
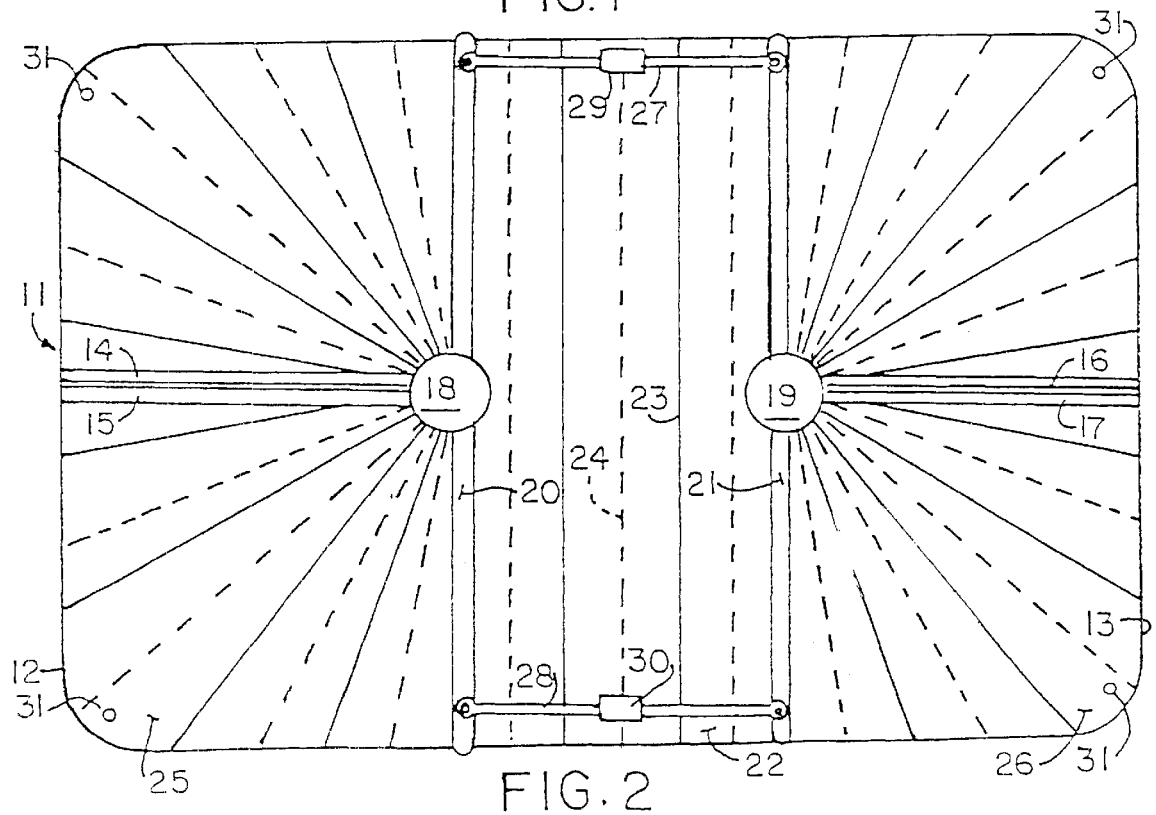
FIG. 2 provides a front view of a modified form of auto shade, which is fabricated similar to that as the shade of FIG. 1, but in this condition incorporates a pair of pivotal segments, held apart by means of a linearly expandable component of the shade for protecting larger sized automobile windshields against the entrance of sun rays.

FIG. 2 discloses a similar type construction for a collapsible auto shade, as that as described in FIG. 1. In this position, the shade 11 may include a pair 12 and 13 of the shades as previously disclosed, incorporating the various ribs 14 and 15, with respect to the shade 12, and 16 and 17, with respect to the shade 13, and which pivot about their pivot points 18 and 19, in the manner as previously described. These shades 12 and 13 can be described as a left shade portion 12 and a right shade portion 13. In this particular instance, the two shades 12 and 13 have base ribs 20 and 21, and which includes fabric 22 arranged intermediate thereof, formed of a series of gussets 23 and 24 to allow for their collapsibility, when contracted. Similar type of fabric is provided at 25 and 26, for the shades 12 and 13, in the manner as previously described. In order to hold the portion of the shade 22 into its linearly expanded position, latching means 27 and 28 are provided, so that when they are expanded, they are latched into position by means of their locks 29 and 30, to maintain the fabric 22 in its expanded position. The pivot points 18 and 19, including the fastening means as previously described, may include suction cups, upon their opposite faces, and which may be useful for holding the screen against and to the interior of the automobile windshield, when applied. Likewise, other types of fastening means, such as double faced tape, string, or the like, can be used and applied to the corners of the shade, as disclosed at 31, to provide an alternative means for holding the shade against the windshield, when installed.

Figure 3:
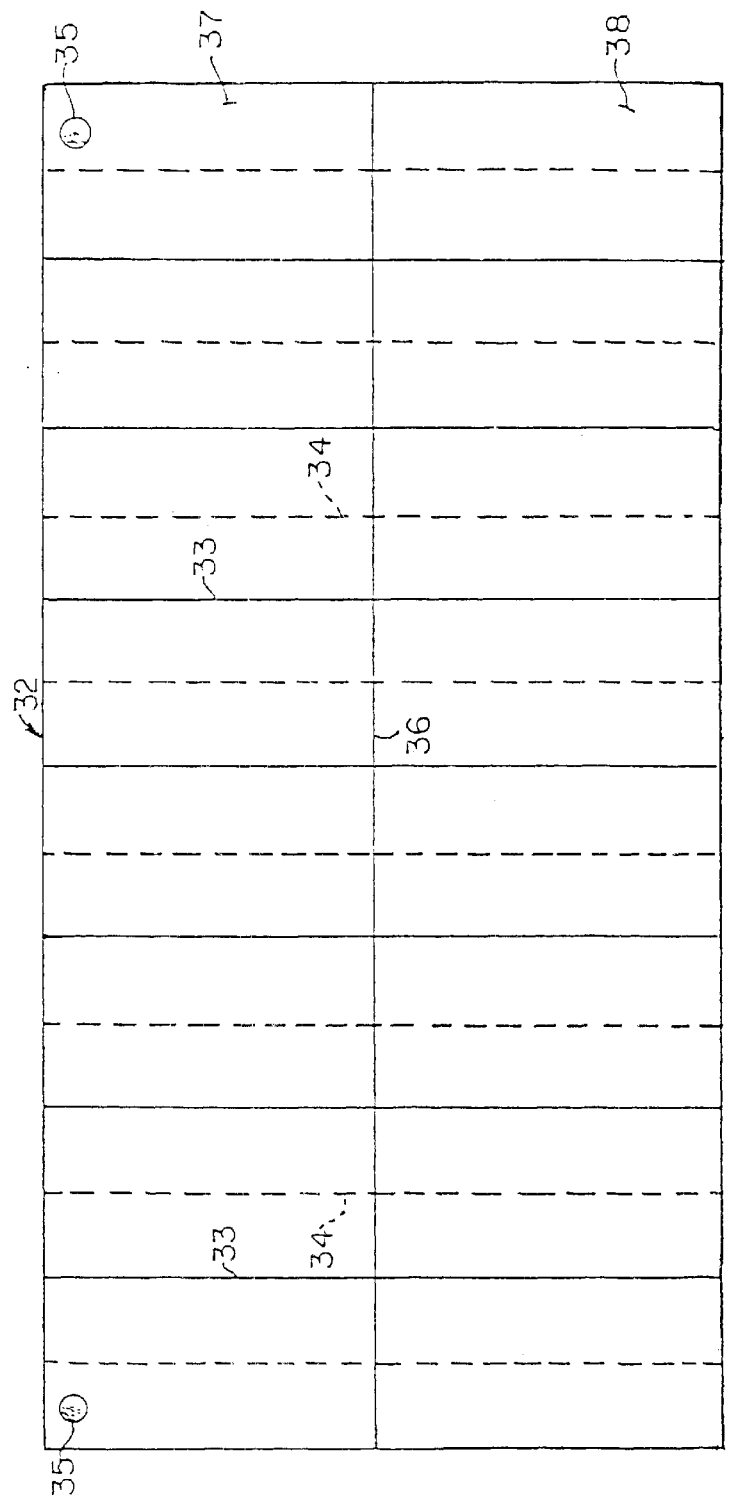
FIG. 3 shows a shaped sun shade formed of a fabric material, such as MYLAR, and which incorporates inherent resilient memory so that the shade can be expanded into the position as shown herein.
Figure 5:
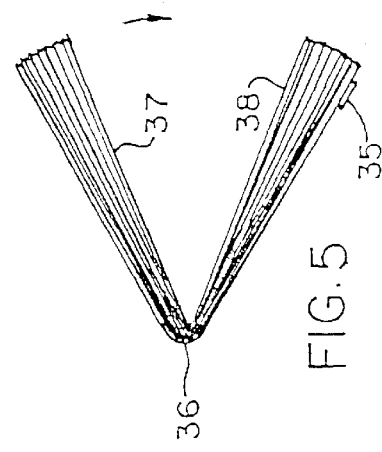
FIG. 5 shows the sun shade of FIG. 4 as it is folded into its final compact storage position.
Figure 4:
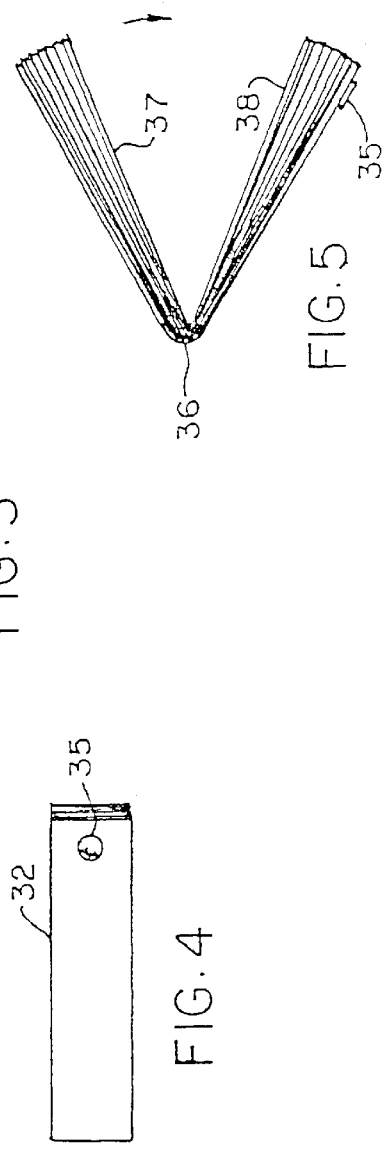
FIG. 4 discloses the sun shade of FIG. 3 when compacted into a collapsed and folded condition producing a small size for storage.

A further modification to the invention herein, is disclosed in FIG. 3, and includes an auto shade 32, which may be formed of a resilient type of memory retention fabric, such as a polymer, like MYLAR, and shaped to any configuration as previously explained, for accommodation within a comparable windshield of like configuration. This MYLAR screen includes a series of flutes, as at 33 and 34, which are formed into the screen material as it is fabricated, and which can be collapsed, into an accordion shape, in the manner as shown in FIG. 5. As noted, the screen may include any type of fastening means, proximate its corners, such as at 35, and may include suction cups, double face tape, or any other means for fastening the screen proximate the windshield, when installed. As when not in use, the shade may be collapsed, about its flutes 33 and 34, into a condensed configuration, and then folded over about its central or midpoint fold line 36, so that its upper half 37 and lower half 38 can be brought into proximity, as noted in FIG. 5, and then fully collapsed into a compact condition, as shown in FIG. 4, ready for storage within the glove compartment, or the like. The fastening means 35 may be useful for holding the upper and lower halves 37 and 38 of the shade together, when it is folded into its storage condition.

In the construction of the shade as shown in FIG. 1, it is likely that the flutes forming the collapsible screen may be of lesser number or greater number than that as shown, and may include as few as four, or be as many as those shown in FIG. 1. In addition, the fastening means may be provided between the ribs 7, so as to hold them into their opened condition, and such fastening means may include a clip, VELCRO, a zipper, or any other means for holding the shade in its opened and usable position. Once the shade is collapsed, into its storage position, it may undertake the appearance, as for example, of an umbrella, which when folded into closure, may be held together by a strap (not shown), when disassembled.

Figure 7:
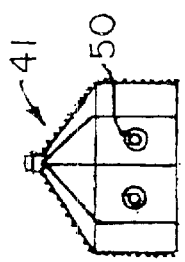
FIG. 7 shows a portion of the top of the embodiment of FIG. 6 view in its closed state in top plan.
Figure 8:
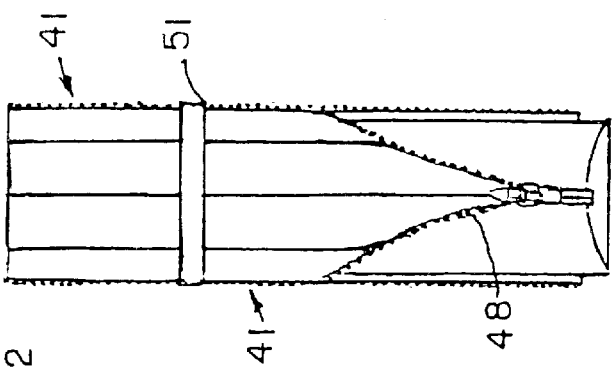
FIG. 8 shows a side elevational view of the embodiment of FIG. 6 in its closed state.
Figure 6:
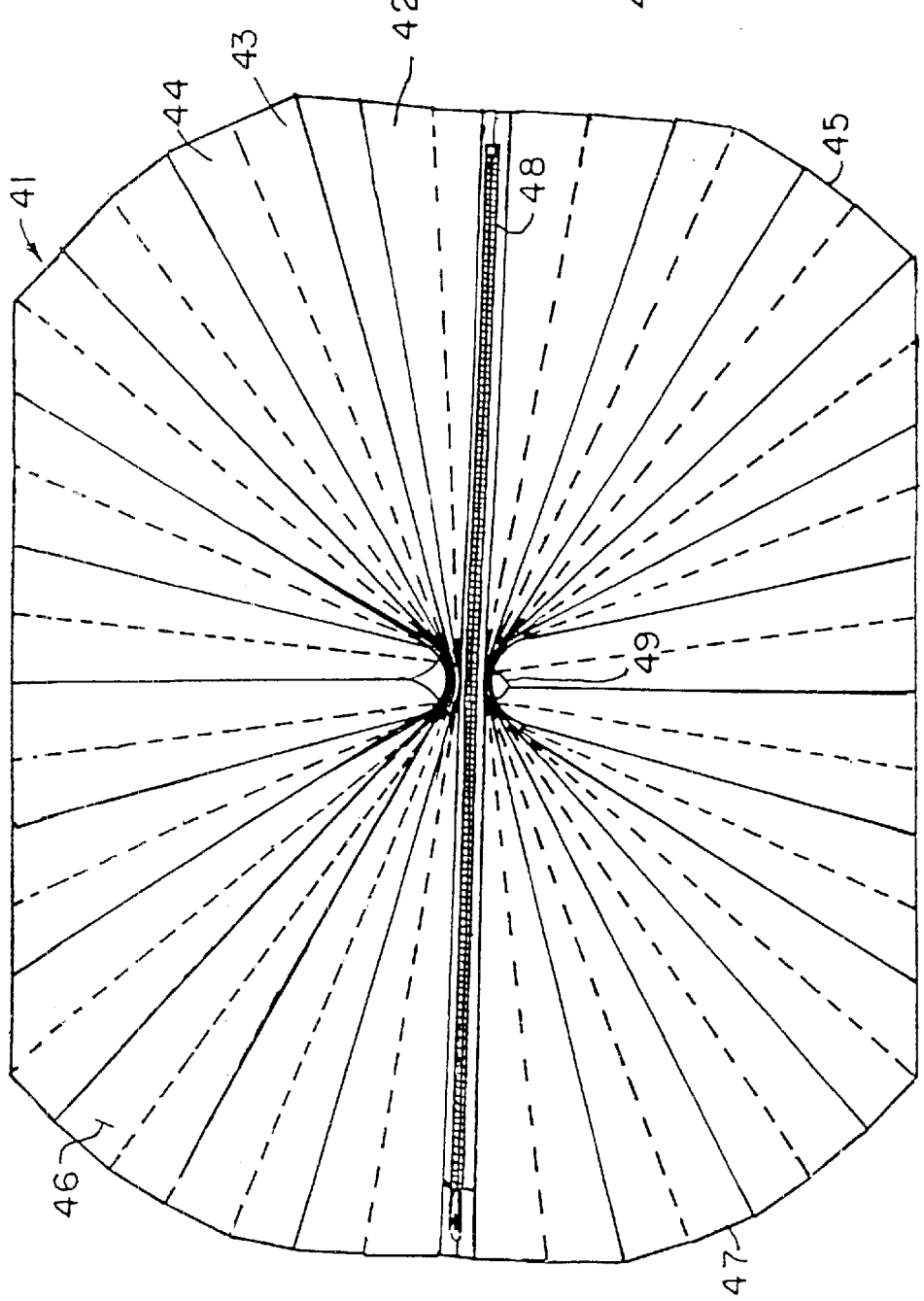
FIG. 6 shows a top plan view of a fourth alternative embodiment of a sun shade of the present invention in its open state.
Figure 9:
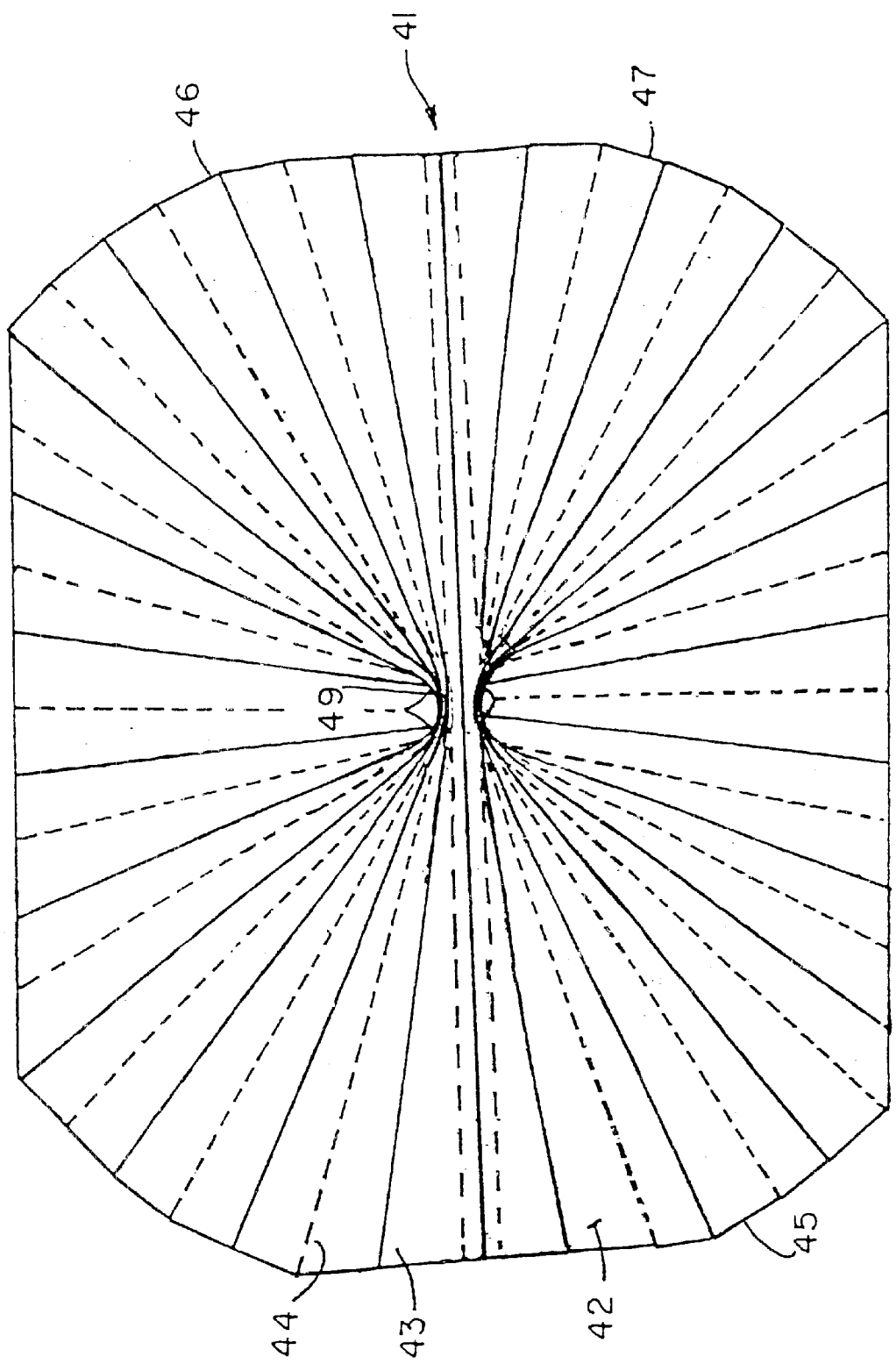
FIG. 9 shows a bottom plan view of the embodiment of FIG. 6 a sun shade of the present invention in its open state.

A fourth embodiment of the present invention is disclosed in FIGS. 6–9, which show an auto shade 41 which may be formed of a resilient type of memory retention fabric 42, such as a polymer, like MYLAR, and shaped to any configuration as previously explained, for accommodation within a comparable windshield of like configuration. This screen includes a series of flutes, as at 43 and 44 which are formed into the screen material as it is fabricated, and which can be collapsed, into an accordion shape, in the manner previously described. The outer edge 45 may include a reinforcing strip of material (not shown), or may simply be a defining edge of the same material 42. In this embodiment of the invention, a top portion 46 and bottom portion 47 are defined by a closure means 48, which is in this example a zipper. It is to be understood that closure means 48 could easily be constructed of various other materials, such as VELCRO or snaps. As has been described for the previous embodiments, the flutes or pleats 43 and 44 radiate from a center point 49 to the outer edge 45. As can be seen in FIG. 7, fastening means 50 are preferably included in the top portion of the shade 41, as in a manner analogous to the fastening means 31 shown in FIG. 2. As can be seen in FIG. 8, when the closure means 48 is disengaged, the shade 41 can be folded into a compact, closed state. The folding of this fourth embodiment is accomplished as follows; the closure means 48 is disengaged and opened, the top portion 46 and bottom portion 47 are folded together along a line defined by the closure means 48, and the material 42 is folded in an accordion-like manner along the pleats 43 and 44 around the center point 49 into a relatively flat, rectangular shape. A strap 51 may be used to secure the shade 41 in its closed state. Strap 51 has securement means (not shown), such as VELCRO or a snap to secure the strap 51 around shade 41.

Figure 10:
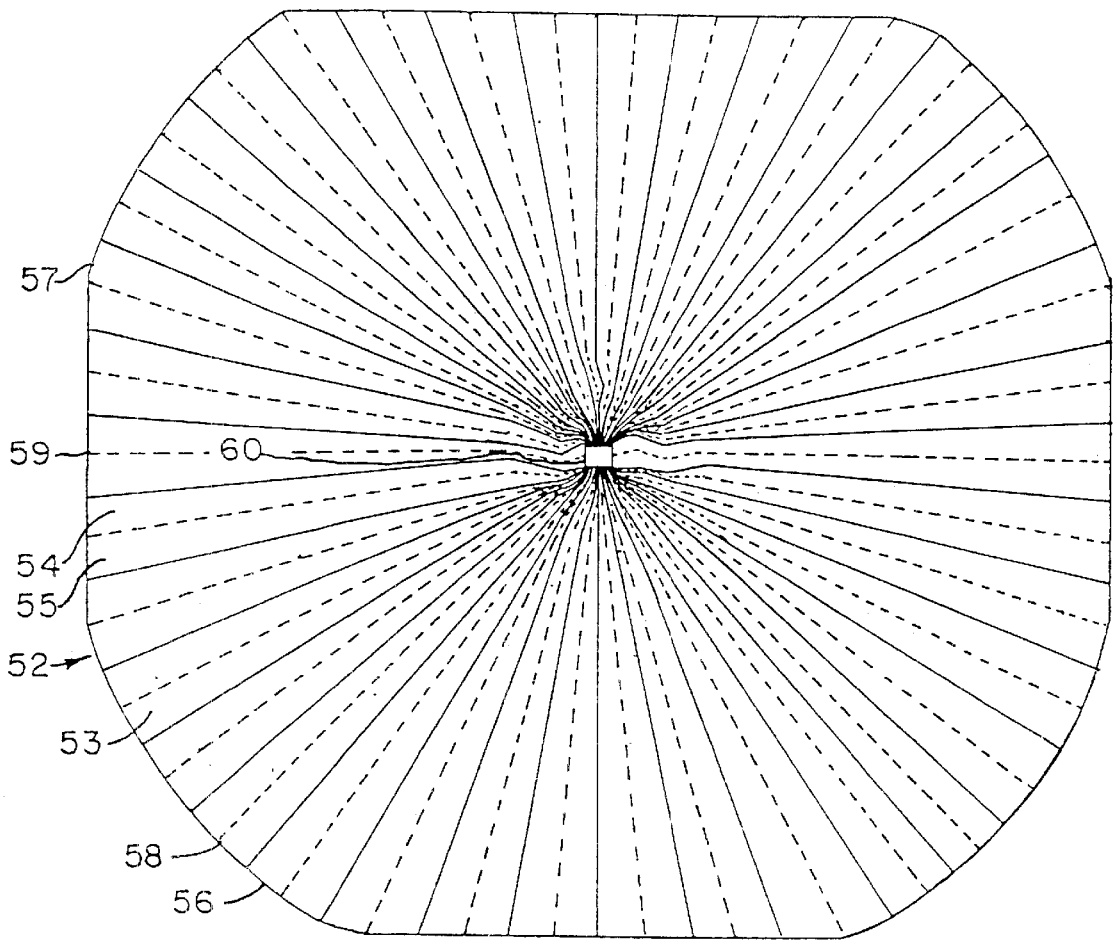
FIG. 10 shows a top plan view of a fifth embodiment of the present invention in its open state.

A fifth embodiment of the present invention is shown in FIGS. 10–14. Referring to FIG. 10, an auto shade 52 is made from a material 53 with a memory, that is, capable of retaining pleats 54 and reverse pleats 55. As in the previous embodiments, an outer edge 56 defines the border of the shade. A top portion 57 and a bottom portion 58 are defined by center line 59, which is a pleat or fold extending from one edge of outer edge 56 to the opposite edge. A mid-point 60 is approximately in the middle of center line 59. The pleats 43 and 44 radiate outwardly from mid-point 60, and mid-point 60 acts as a pivot point as will be described below.

Figure 11:
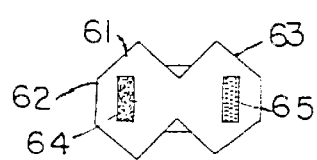
FIG. 11 shows a bottom plan view of the embodiment of FIG. 10 in the closed state of the shade.
Figure 12:
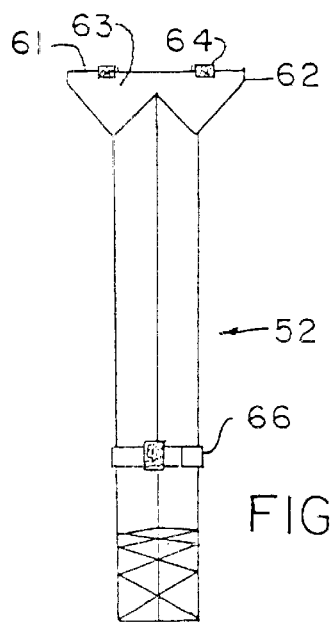
FIG. 12 shows a front view of the embodiment of FIG. 10 in the closed state of the shade.
Figure 13:
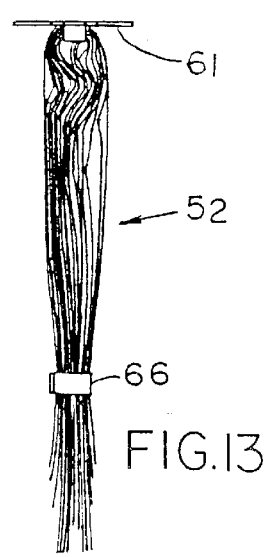
FIG. 13 shows a side elevational view of the embodiment of FIG. 10 in its closed state.

Referring to FIG. 11 and FIG. 12, a flap assembly 61 comprises left flap 62 and right flap 63, with fastening means 64 and 65. In the preferred embodiment, the fastening means comprises VELCRO loops 64 and VELCRO hooks 65, which cooperate to fasten the shade 52 in the open position. FIG. 14 shows the under side of the shade 52, with flap assembly 61 in the closed position, thereby holding the shade 52 open.

To collapse the shade 52, the flap assembly is disengaged, releasing left flap 62 from right flap 63. The shade is then folded along the center line 59, bringing top portion 57 in contact with bottom portion 58 along outer edge 56. The folded halves 57 and 58 of shade 52 are then folded in an accordion fashion along the pleats 54 and 55 and about the pivot point defined by mid-point 60, into a generally rectangular shape shown in FIG. 12 and FIG. 13. A strap 66 can be applied to the collapsed shade to hold the shade in the collapsed position.

A sixth embodiment of the present invention is shown in FIGS. 15–18. This embodiment is similar in structure to the embodiment shown in FIGS. 6–9, but has fastening means that extend midway instead of completely across the shade, as will be described. The shade 71 is made from a material 72 with a memory, that is, capable of retaining pleats 73 and reverse pleats 74. As in the previous embodiments, an outer edge 75 defines the border of the shade. A top portion 76 and a bottom portion 77 are defined by center line 78, which is a pleat or fold extending from one edge of outer edge 75 to the opposite edge. A mid-point 79 is approximately in the middle of center line 78. The pleats 73 and 74 radiate outwardly from mid-point 79, and mid-point 79 acts as a pivot point. Pleats 73 and 74 extend radially outwardly from mid-point 79 to outer edge 75. A retaining means 80 for retaining the shade 71 to an automobile window may be attached to the mid-point 79. In this illustrative embodiment, a suction cup 80 acts as the retaining means. The suction cup 80 may be secured to mid-point 79 by adhesive, sewing, or by any other appropriate manner.

Fastening means 81 extends from about the mid-point 79 or slightly beyond mid-point 79 to the edge 75. In this illustrative embodiment, the fastening means 81 is a zipper, although it will be understood that any means, such as VELCRO or snaps for example, could be used.

The shade 71 is collapsed into a compact shape by disengaging the fastening means 81 to provide two sections 82 and 83 to open. Section 82 is rotated about mid-point 79 in a counter-clockwise fashion, while section 83 is rotated about mid-point 79 in a clockwise fashion, along pleats 73 and 74, until sections 82 and 83 are opposite each other, and shade 71 is in a compact, generally rectangular orientation. A strap 84 may secure shade 71 in this compact position, with releasable securement means (not shown), such as VELCRO or a snap to secure the strap 84 around shade 71.

A seventh embodiment of the present invention is shown in FIGS. 19–24. In this embodiment, the shade 91 has material 92 whose boundaries are defined by an edge 93. Unlike the prior embodiments, the material need not be made from a fabric that retains a pleat or fluted crease, but may include also a fabric that is easily deformed into any shape without a memory. As in the other embodiments, the outer edge 95 may be reinforced with a border 94, which in this illustrative embodiment is made from simply rolling the outer edge back on itself approximately ¼" and securing the edge by sewing. Referring to FIG. 19, flaps 95 are formed at the corners of material 92 toward outer edge 93. A mid-point 96 is located generally in the center of material 92. Referring to FIG. 21, the mid-point 96 may be, but is not necessarily a structure, but rather a reference point. Referring now to FIG. 19 and FIGS. 22–24, a hub 97 is located at the midpoint 96 of shade 91, with arms 98–101 extending radially therefrom. The hub 97 is preferably attached to the mid-point 96, as by gluing or other appropriate attachment means. The hub 97 is formed of two halves, a left half 103 and a right half 102. A hinge 104 connects the two halves 102 and 103 of hub 97. Referring to FIG. 22, arms 98–101 are movable within a range defined by stops 105–108 in hub 97, which correspond to arms 98–101 respectively. In this way, hub 97 acts as a pivot point with respect to arms 98–101. In this illustrative example, the arms may rotate from a starting point roughly perpendicular to the imaginary line H passing through the center of hinge 104 to a line at about forty-five degrees from the imaginary line H. In other words, the individual arms 98–101 are originally about parallel to each other, and when rotated to their outermost extended state are perpendicular to each other. FIG. 19 shows the arms 98–101 in their extended, perpendicular state for supporting material 92 of shade 91 in an open position. Each half 102 and 103 of hub 97 has retaining means 109 and 110, respectively, for removably fastening the halves 102 and 103 together in the extended state of shade 91.

To collapse the shade 91, halves 102 and 103 are separated through disengagement of retaining means 109 and 110, and halves 102 and 103 are rotated about hinge 104 until halves 102 and 103 are in a position roughly parallel to each other. Arms 98–101 are then rotated from the point of being generally perpendicular to each other to the point of being generally parallel to each other, thus collapsing the shade 91 into a compact, generally rectangular shape.

An eighth embodiment of the present invention is shown in FIG. 25. This embodiment is similar in form to the seventh embodiment shown in FIGS. 19–24. As in the seventh embodiment, an auto shade 111 has a material portion 112 defined by a peripheral or outer edge 113. In the preferred embodiment, the auto shade 111 is rectangular in shape. Preferably, the outer edge 113 is reinforced by border 114. Border 114 may be a separate material, or may be a folding and sewing of the material portion 112. Pockets 115 are formed at the four corners of shade 111, as by sewing or gluing. Four arms, 116–119 project from the center 120 at hub 121. The hub 121 is preferably attached to the center 120, as by gluing or other appropriate attachment means. The terminal ends of each arm 116–119 fits into the pockets 115.

However, unlike the seventh embodiment of the present invention, in the eighth embodiment, a fastener 122 extends from the center or mid-point 120 to the edge 113. In the preferred embodiment, the fastener 122 is a zipper, although it will be understood that any appropriate fastener, such as VELCRO hook and loop fasteners or snaps, for example, could be used. The fastener 122 divides the lower portion of shade 111 into two parts, a left portion 123 and a right portion 124. The arms 116–119 rotate freely about hub 121, that is to say there are no stops in hub 121 as there are in the seventh embodiment of the present invention. A cord 125 is secured to the material 112, as by gluing or other appropriate attachment means. Cord 125 may be used to secure the shade 111 to a rear view mirror of an automobile, for example.

To collapse the shade 111, the fastener 122 is disengaged from its fastened position. Left portion 123 and right portion 124 are moved away from one another, that is to say left portion 123 is rotated in a clockwise direction from the fastener 122, while right portion 124 is rotated in a counter-clockwise direction from the fastener 122. As the left portion 123 and the right portion 124 are rotated away from one another, the arms 116–119 are rotated about hub 121 until the arms 116–119 are positioned adjacent to one another, and the shade 111 is collapsed into a compact, generally rectangular shape.

Variations or modifications to the subject matter of this invention may occur to those skilled in the art upon reviewing the subject matter of this invention as described herein. Such variations or modifications are intended to be encompassed within the scope of the invention as described herein and the description of the preferred embodiment and the various structures of this auto shade invention, as described herein, are set forth for illustrative purposes only.

I claim:

1. A collapsible automobile shade comprising:
   a fabric portion having an outer edge defining the outer boundary of the shade, and flutes formed therein; said shade being ribless in support of said fabric portion of the shade;
   a pivot point positioned inwardly of said outer edge and being located generally at a horizontal center of said shade; said flutes extending from said pivot point and radiating outward to said outer edge; and
   a fastener for holding the shade in an open state for use in an automobile.

2. The collapsible automobile shade of claim 1 wherein said fastener comprises a pin at said pivot point, said pin being selectively tightenable to hold said shade opened and loose to collapse said shade.

3. The collapsible automobile shade of claim 1 wherein said fabric portion is made from a material having a memory such that said flutes formed in said fabric portion tend to return said shade to a closed position upon release of said fastener.

4. A collapsible shade for covering a transparent, exteriorly facing portions of an automobile comprising:
   a material portion defined by an outer edge;
   a pivot point positioned inwardly of said outer edge and being located generally at a vertical center of said shade; said material extending from said pivot point when said shade is erected; the material portion may being rotatable about said pivot point for opening and closing said shade; said pivot point comprising a hub having a first half and a second half; said first and second hub halves being hingedly connected together and movable between a first folded position and a second unfolded position in which the halves are separated; said hub further including a retainer to hold said hub in the first, connected, position; and
   a closure, said closure retaining said shade in said open position when engaged and said closure facilitating collapsing of said shade when disengaged.

5. The shade of claim 4 wherein said material further has pleats formed therein, said pleats extending from said pivot point to said outer edge; and said shade being collapsible said pleats around said pivot point.

6. The shade of claim 5 wherein a center line defines upper and lower portions of said shade, and said closure extends at least partly along said center line.

7. The shade of claim 4 further comprising a plurality of arms, said arms extending from said pivot point to said outer edge and connected to said material portion, and said arms rotatable around said pivot point for positioning said shade from an open position to a relative compact, closed position.

8. The shade of claim 7 said arms are removable from said material portion.

9. The shade of claim 7 further comprising a fastener, said fastener extending from said pivot point to said outer edge, said fastener acting to hold said shade open when engaged, and said fastener allowing said shade to be collapsed when disengaged.

10. The shade of claim 7 wherein said arms move relative to said hub when said shade is moved between its collapsed and expanded positions.

* * * * *